Dec. 10, 1935.  W. A. PHILLIS  2,024,112
SAW GUIDE FOR PIPES AND SIMILAR ARTICLES
Filed Nov. 22, 1934
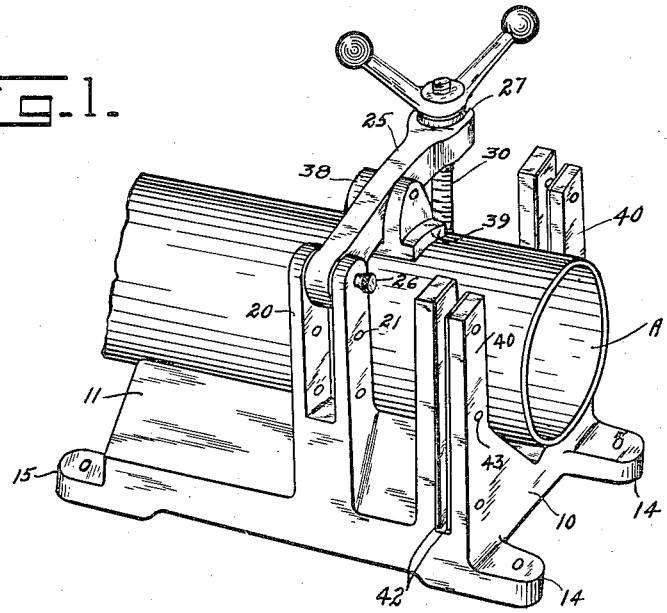
Fig. 1.
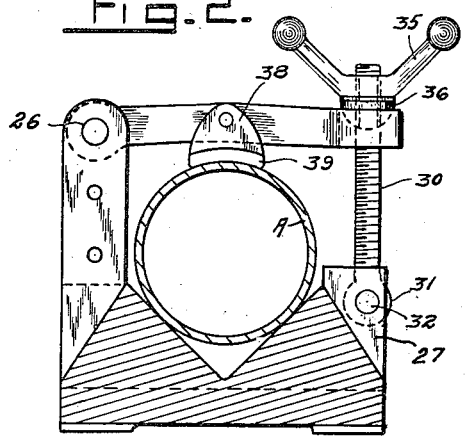
Fig. 2.
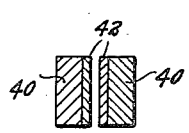
Fig. 3.
Fig. 4.
Inventor
William A. Phillis,
By Bates, Golrick & Teare,
Attorneys Patented Dec. 10, 1935

2,024,112

UNITED STATES PATENT OFFICE 2,024,112

SAW GUIDE FOR PIPES AND SIMILAR ARTICLES

William A. Phillis, Warren, Ohio, assignor to Beaver Pipe Tools, Incorporated, a corporation of Ohio Application November 22, 1934, Serial No. 754,263

5 Claims. (Cl. 29—67)

This invention, which is a continuation in part of my prior application 639,259, filed October 24, 1932, relates to a simple device for holding a pipe and guiding a saw blade in a plane at right angles to the axis of the pipe, so that the pipe may be cut, readily and accurately. Of recent date, thin walled copper tubing has come into use as a substitute for iron pipe, but it has been found impracticable to clamp such tubing in an ordinary pipe vise or to cut it with an ordinary pipe cutter, as both the vise and the cutter distort the pipe. Such tubing may be cut by a hack-saw, but, if the tube is held by hand while sawing it off, the operation is liable to be inaccurate and not strictly at right angles to the axis of the tube, resulting in difficulty in properly coupling the tubing when installing it.

My invention provides a device adapted to readily center tubes or pipes of various sizes, and hold such article in place without injuring it; at the same time properly guide a saw blade, so that the article may be cut accurately at right angles to its axis.

My invention, comprising the clamping and guiding device above outlined, is illustrated in the drawing hereof, and is hereinafter more fully described, and the essential novel features are summarized in the claims.

In the drawing, Fig. 1 is a perspective of the device constituting this invention ready for installation on the bench and showing a tube or pipe clamped in position; Fig. 2 is a cross-section taken between the clamp and saw guide; Fig. 3 is a cross-section of the base beyond the clamp; Fig. 4 is a detail in cross-section of one of the saw-guiding posts.

As shown in the drawing, the base 10 is a solid block of metal having two upstanding longitudinal ridge portions 11 and 12 leaving between them the continuous V-groove 13. On each end of the base are a pair of ears 14 and 15, which are perforated for the passage of bolts or screws, so that the device may be readily secured to a bench.

The standard for the clamp comprises a bifurcated post 20 extending upwardly from the base, preferably from the outer face of the ridge 11. This post is preferably cast integral with the base. Formed within the two arms of the post 20 are a series of holes 21 aligned with each other in the respective arms. "25" designates a clamping lever which is pivotally connected to the standard 20 in various selected positions by means of a pin 26, which may occupy any of the aligned holes in the standard. Directly opposite the standard and rising from the outer face of the ridge 12 is a bifurcated boss 27. A suitable screw 30 is formed with an eye 31 at its lower end extending into the bifurcated boss to which the screw is pivoted by a pin 32 passing through the boss and eye. The upper portion of the screw is adapted to occupy an open slot 27 in the extreme end of the arm 25. A wing nut 35 on the screw bears downwardly on the suitably formed washer 36, which occupies a recessed seat on the upper face of the arm. Pivoted intermediate to the arm is a bifurcated block 38 which at its lower end is concave on its underside and is preferably extended longitudinally as indicated at 39.

The construction described enables the effective clamping of a tube in the V-groove 13 without danger of marring it. Figs. 1 and 2 show the device clamping a comparatively large tube, designated A. For a smaller size tube the pin 26 is withdrawn and inserted through a lower set of holes in the standard 20, and accordingly the device is adapted to clamp tubes of various sizes from a comparatively small one to a comparatively large one.

The clamp, as heretofore described, is preferably located somewhat nearer one end of the base than the other. Rising near the base adjacent the end nearest the clamp are the two bifurcated posts 40, which guide the saw. These posts extend preferably from the outer inclined faces of the two ridges 11 and 12 and their body is cast integral with the base. The bifurcation extends substantially as low as the bottom of the V-groove, so that a saw blade occupying the bifurcation will always be able to pass entirely through any tube resting in the groove.

To prevent the saw teeth from cutting the walls of the guiding posts I line these walls with hardened steel strips 42. These strips may be suitably held in place by rivets passing through the body of the post, as indicated at 43 in Fig. 1. By counter-sinking the inner face of the rivet holes in the steel strips and counter-sinking the outer end of the holes in the post bodies it is simple to insert the two facing strips and place material to constitute soft rivets in the openings 43, and then with a suitable temporary anvil between the two facing strips to upset the rivets both at their inner and outer ends by suitable blows on the outer ends thereof.

It will be noticed that the inner arms of the posts 40 extend slightly higher than the outer arms. This forms a convenient positioning device for the saw, which may be simply moved lengthwise of the pipe until the blade bears against the projection of the inner arms of the post, whereupon the saw is automatically positioned to pass into the kerf for operation on the pipe.

It will be seen that the device is very simple in construction, the whole body being preferably of one single integral casting. The clamp is simple and readily attached in various positions. The saw is effectively guided and there is no danger of its continued use enlarging the guiding kerf. Accordingly, the device is well adapted for the particular use intended.

I claim:

1. In a device of the character described, the combination of a base formed with a longitudinal V-groove in its upper face to center a tube, a pair of bifurcated posts carried by the base on opposite sides of the groove, the notches of said posts being comparatively narrow and aligning in a plane transverse to said longitudinal groove, a bifurcated post rising from the base, a lever adapted to be pivoted to the latter post in various positions, a screw pivoted to the base on the opposite side from the standard, and adapted to occupy a notch in the end of the lever, a nut acting on said screw to force down the lever, and a saddle pivotally carried intermediately of the lever and adapted to engage a pipe resting on the V-groove.

2. The combination of a base adapted to be secured to a bench, said base having a pair of ridges on its upper portion extending substantially from end to end of the base to provide a continuous V-groove between them, a pair of laterally aligned upwardly extending bifurcated posts carried by the base to position a saw blade transversely of the V-groove, a standard rising from the base on one side of the V-groove, a screw connected to the base on the other side of the V-groove and a lever pivoted to the standard and engaged by a nut on the screw, and a saddle pivoted intermediately to said lever and adapted to engage a tube in the V-groove.

3. In a device of the character described, the combination of a base formed with a longitudinal V-groove in its upper face, a pair of bifurcated posts rising from the base on opposite sides of the V-groove and rigid therewith, the furcations of the two posts laterally aligned and being continued by grooves in the base between them to provide a continuous space for a saw blade, said space being accurately defined by hardened metal facing strips lining the walls of the furcations in the posts, and a clamp carried by the base adapted to hold a tube with a portion thereof in the seat between the posts.

4. In a device of the character described, the combination of a base formed with a pair of parallel ridges on its upper face to provide a longitudinal V-groove between them, a pair of bifurcated posts rigid with the base and rising therefrom, to guide a saw blade, and a clamping device for holding a tube resting in the V-groove.

5. In a device of the character described, the combination of a base in the form of a V-block, a pair of separated bifurcated posts rising from opposite sides of the base and adapted to guide a saw blade transversely of the pipe seat between said posts, a standard rising from the base, a lever adapted to be pivotally connected to the standard in various positions on the standard, a saddle carried by the lever pivotally on an axis parallel to the length of said V and adapted to engage the upper portion of a pipe resting in the V, and a screw and nut adapted to connect the other end of the lever with the base on the other side of the pipe.

WILLIAM A. PHILLIS.